(12) United States Patent
Rudolph et al.

(10) Patent No.: US 6,705,807 B1
(45) Date of Patent: Mar. 16, 2004

(54) HOLE SAW AND CONNECTION METHOD

(75) Inventors: Scott Rudolph, Cockeysville, MD (US); Robert D. Harris, Baltimore, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 10/130,898

(22) PCT Filed: Nov. 22, 2000

(86) PCT No.: PCT/US00/32251
§ 371 (c)(1), (2), (4) Date: Oct. 4, 2002

(87) PCT Pub. No.: WO01/38028
PCT Pub. Date: May 31, 2001

Related U.S. Application Data (60) Provisional application No. 60/167,496, filed on Nov. 24, 1999.

(51) Int. Cl.[7] ............................................. B23B 51/04
(52) U.S. Cl. .................. 408/1 R; 408/68; 408/204; 408/209; 408/239 R; 279/77; 279/143
(58) Field of Search ......................... 408/204, 703, 408/226, 1 R, 68, 206, 207, 209, 239 R, 239 A, 240; 279/77, 78, 143, 145; 403/348, 349

(56) References Cited

U.S. PATENT DOCUMENTS

| 1,945,760 A | * | 2/1934 | Strouf ........................ 285/376 |
|---|---|---|---|
| 2,779,361 A | | 1/1957 | McKiff |
| 3,162,067 A | | 12/1964 | Koons et al. |
| 3,390,596 A | | 7/1968 | Trevathan |
| 3,880,546 A | | 4/1975 | Segal |
| 3,976,387 A | * | 8/1976 | Segal ........................ 408/204 |
| 4,077,737 A | * | 3/1978 | Morse ........................ 408/703 |
| 4,174,648 A | * | 11/1979 | Wallis ........................ 279/79 |
| 4,303,357 A | | 12/1981 | Makar |
| 5,597,260 A | * | 1/1997 | Peterson ..................... 403/348 |
| 5,709,393 A | * | 1/1998 | von Keudell et al. ......... 279/78 |
| 5,967,709 A | * | 10/1999 | Thuesen ..................... 408/204 |

FOREIGN PATENT DOCUMENTS

JP 105811 4/1992

OTHER PUBLICATIONS

International Search Report—PCT/US00/32251, ISA./US, Jan. 25, 2001.

* cited by examiner

Primary Examiner—Daniel W. Howell
(74) Attorney, Agent, or Firm—Harness, Dickey & Pierce, P.L.C.

(57) ABSTRACT

The hole saw assembly provides a structure and method for efficiently and securely connecting a hole saw to an arbor and easily connecting a pilot bit to the arbor. The arbor has a shank opposite the coupling end and a receiving slot proximate to the coupling end. The receiving slot is adapted to receive a mounting tag of the hole saw to couple the hole saw to the adapter body. The arbor also includes a selector sleeve slidably coupled to the body for movement between a first position allowing the receiving slot to receive the hole saw and a neutral position wherein the selector sleeve prevents removal of the hole saw mounting tab from the receiving slot.

11 Claims, 12 Drawing Sheets

HOLE SAW AND CONNECTION METHOD

CROSS REFERENCE TO RELATED APPLICATIONS

Incorporated by reference herein are United States Provisional Application No. 60/167,496, filed Nov. 24, 1999 and International Application No. PCT/US00/32251, filed Nov. 22, 2000, which application was published in the English language. Priority is claimed from each of these applications.

BACKGROUND OF THE INVENTION

1. Technical Field

The present invention relates generally to hole saws and, more particularly, to a structure and method for coupling a hole saw and pilot bit to a drill.

2. Discussion

Figure 1:
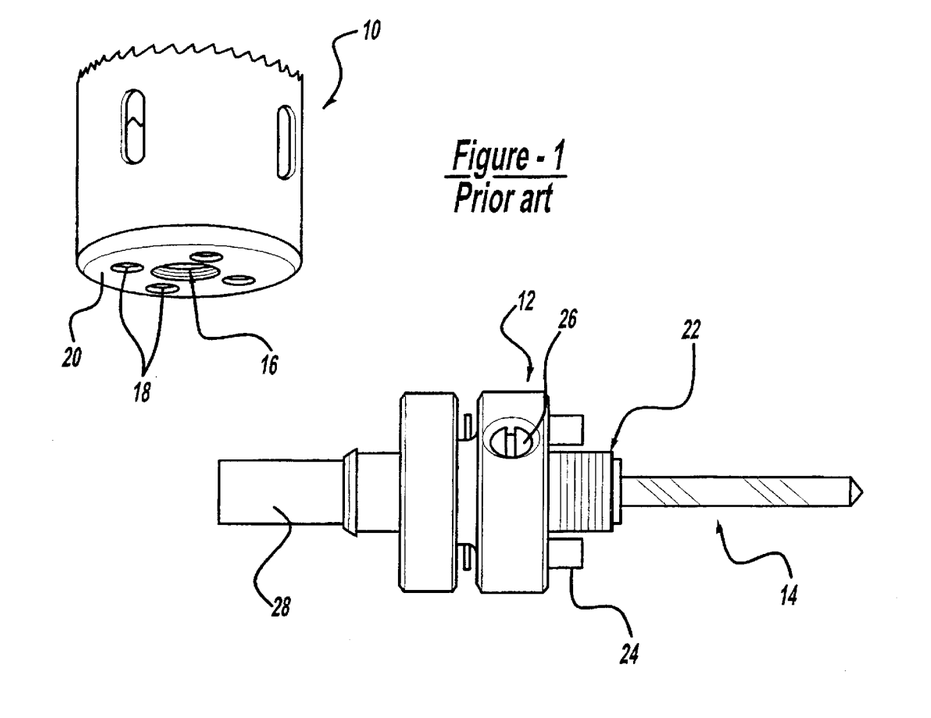
FIG. 1 illustrates a conventional hole saw assembly.

A hole saw is a drill accessory that allows a user to make circular cut-outs in a material such as wood, steel, fiberglass, plastic, etc. Hole saws generally range in size from five-eighths of an inch to six inches in diameter. The main components of conventional hole saws include, as best illustrated in FIG. 1, a saw 10, an arbor 12, and a pilot bit 14. The saw commonly includes a threaded aperture 16 and a plurality of mounting holes 18 formed in the closed end 20 of the saw. The arbor includes a post 22 that is threaded to cooperate with aperture 16 to releasably couple the arbor to the saw. The arbor further includes pins 24 that are disposable within the mounting holes 18 to prevent the saw from unscrewing off the threaded post 22. The pilot bit is disposable within a cavity in the threaded post, is held in place by a set screw 26 and protrudes from the cutting edge of the saw to guide the saw during cutting. Finally, the arbor includes a shank 28 that is connectable to a drill or driver and that in many configurations is non-circular or hex-shaped in cross-section.

While the above-described hole saw assembly and similar arrangements in the art have proven to operate in a generally satisfactory manner, numerous areas for improvement exist. For example, due to the relative positioning and sizes of the threaded post and mounting pins, conventional hole saw arbors are specifically designed for use with hole saws having diameters between either five-eighths of an inch to one and three-sixteenths inches or, on the other hand, for diameters between one and one-quarter inches to about six inches. The different arbor configurations require consumers to purchase and stock additional tools as well as increase the general complexity of using such products. Further, the multiple steps and movement of the plurality of parts required to couple and uncouple the arbor to the hole saw as well as the additional tools needed to connect and disconnect the hole saw and/or pilot bit to the arbor make it difficult and time consuming to remove plugs of cut material from the hole saw as well as to replace the pilot bit. Additionally, when coupling the arbor to the hole saw, the post 22 is threaded into the aperture 16 and hand tightened. The hole saw is then rotated slightly in the opposite direction to align the mounting holes 18 with pins 24. The backing-off of the threaded engagement imparts some play in the connection that can result in increased thread wear, elongation of the mounting holes, and chatter during operation of the hole saw.

In view of the above, it would be desirable to provide a hole saw and arbor configuration that allows the arbor to be easily and efficiently coupled to the hole saw, allows the use of a common arbor for a broader range of hole saw sizes, provides for simple connection of the pilot bit to the arbor, permits the operator to efficiently discharge a plug from the hole saw, and that results in a secure connection of the arbor to the hole saw in order to eliminate chatter and wear. These and other benefits are provided by the present invention as is the simplified method of attaching the arbor to the hole saw and/or pilot bit as hereinafter described.

SUMMARY OF THE INVENTION

Accordingly, it is an object of the present invention to provide a hole saw assembly wherein the arbor may be easily coupled to and decoupled from the hole saw.

It is a further object of the present invention to provide a hole saw assembly wherein an operator can connect and disconnect a pilot bit to the arbor with ease and without the use of additional tools.

It is another object of the present invention to provide a hole saw assembly wherein an operator can connect and disconnect the arbor from the hole saw and the pilot bit through selective displacement of a selector sleeve relative to an arbor body between a neutral position, a first operative position, and a second operative position.

Still another object of the present invention is to provide a structure and method for efficiently discharging a plug from a hole saw.

Yet another object of the present invention is to provide an arbor for a hole saw assembly wherein the arbor includes a bit retention assembly and a coupling assembly which are automatically biased into their respective locked and engaged modes to connect the arbor to a pilot bit and hole saw, respectively.

In accordance with the above, one embodiment of the present invention includes an arbor for coupling a hole saw to a drill wherein the arbor includes a body having a coupling end, a shank opposite the coupling end, and a receiving slot proximate to the coupling end. The receiving slot is adapted to receive a mounting tab of the hole saw to couple the hole saw to the adapter body. The arbor also includes a selector sleeve slidably coupled to the body for movement between a first operative position allowing the receiving slot to receive the hole saw tab and a neutral position wherein the selector sleeve prevents removal of the hole saw mounting tab from the receiving slot. The invention also includes a method for coupling an arbor to a hole saw that includes the steps of axially aligning the arbor with the hole saw, axially displacing the arbor relative to the hole saw, and rotating the arbor relative to the hole saw. The present invention also provides an adapter for adapting a conventional hole saw for use with the arbor of the present invention.

Further scope of applicability of the present invention will become apparent from the detailed description given hereinafter. It should be understood however that the detailed description and specific examples, while indicating preferred embodiments of the invention are intended for purposes of illustration only, since various changes and modifications within the spirit and scope of the invention will become apparent to those skilled in the art from the following detailed description.

BRIEF DESCRIPTION OF THE DRAWINGS

The present invention will become more fully understood from the following detailed description and the accompanying drawings wherein.

DETAILED DESCRIPTION OF THE PREFERRED EMBODIMENT

Figure 2:
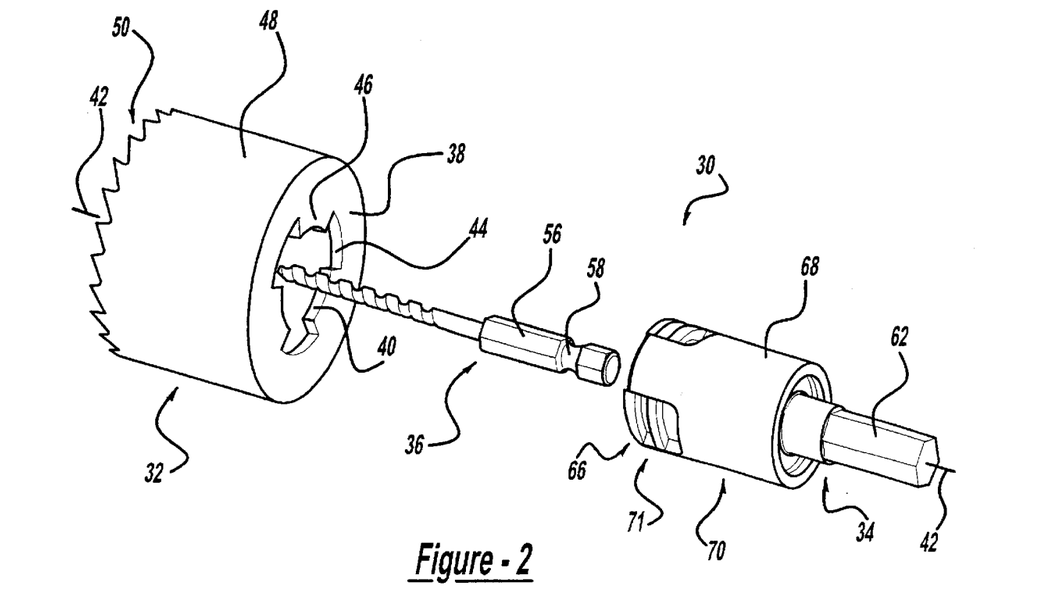
FIG. 2 is a perspective exploded view of the hole saw assembly of the present invention.

With reference to the drawings, FIG. 2 illustrates a hole saw assembly 30 according to an embodiment of the present invention wherein the hole saw assembly 30 includes a hole saw 32, an arbor 34, and a pilot bit 36. The hole saw 32 includes a closed end 38 having an aperture 40 preferably centered about an axis 42. A plurality of release pockets 44 communicate with aperture 40 and are separated from one another by mounting tabs 46. Finally, hole saw 32 includes a generally cylindrical body 48 extending from closed end 38 and terminating at cutting teeth 50. As is shown, the illustrated embodiment includes a trio of equally spaced and alternating relief pockets 44 and mounting tabs 46. However, those skilled in the art will appreciate that different numbers and configurations of the illustrated pockets and tabs may be used without departing from the scope of the invention as defined by the appended claims.

With continued reference to FIG. 2, the pilot bit 36 includes a conventional hex-shaped shank 62 having a detent groove 58 for coupling the pilot bit 36 to the arbor 34 as hereinafter described. Again, those skilled in the art will appreciate that while the pilot bit 36 is illustrated as a conventional spiral drill bit, various other bits may be used with the present invention without departing from the scope thereof as defined by the appended claims.

Figure 3:
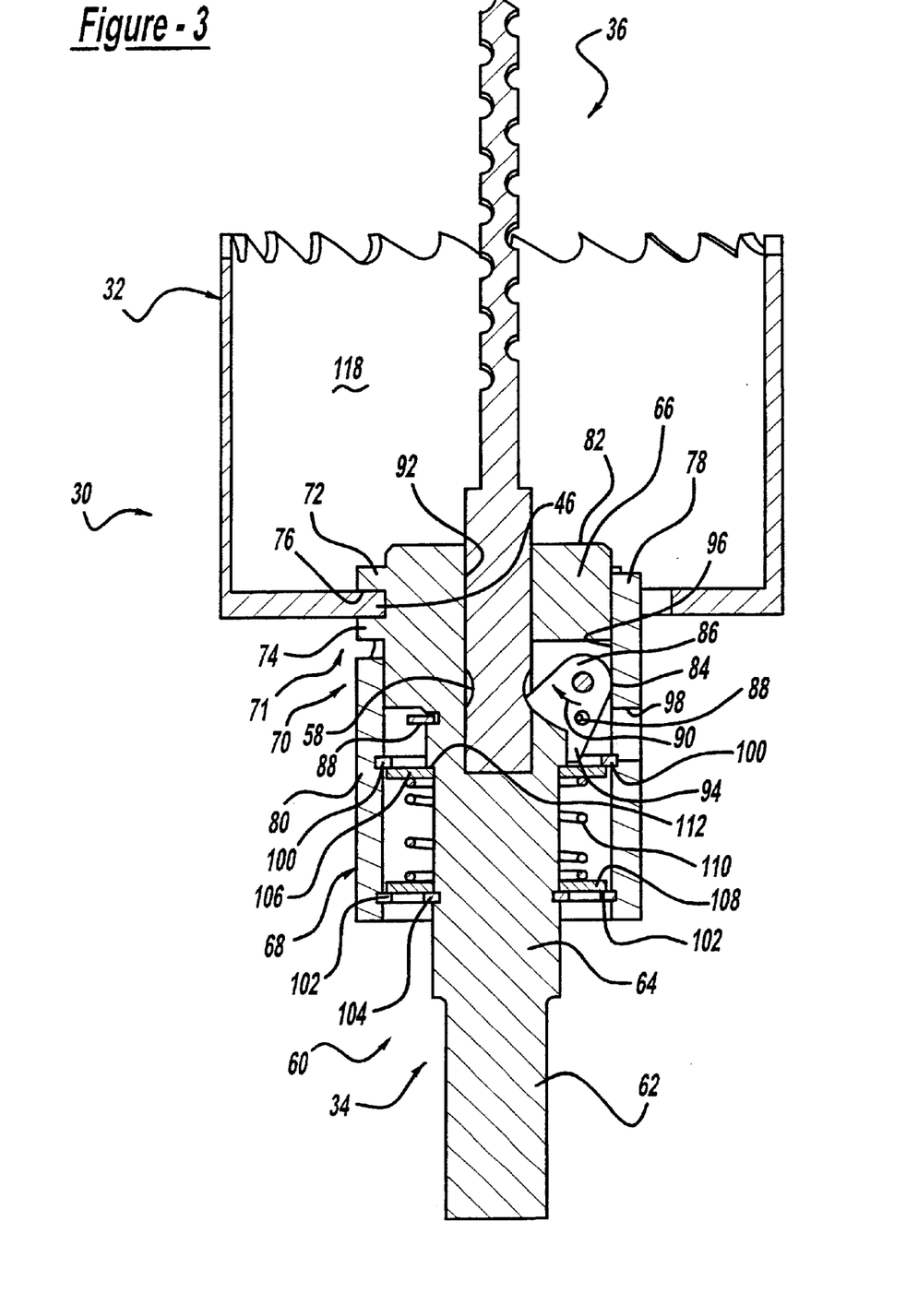
FIG. 3 is a sectional view taken along the longitudinal axis of the assembled hole saw assembly illustrated in FIG. 2.
Figure 4A:
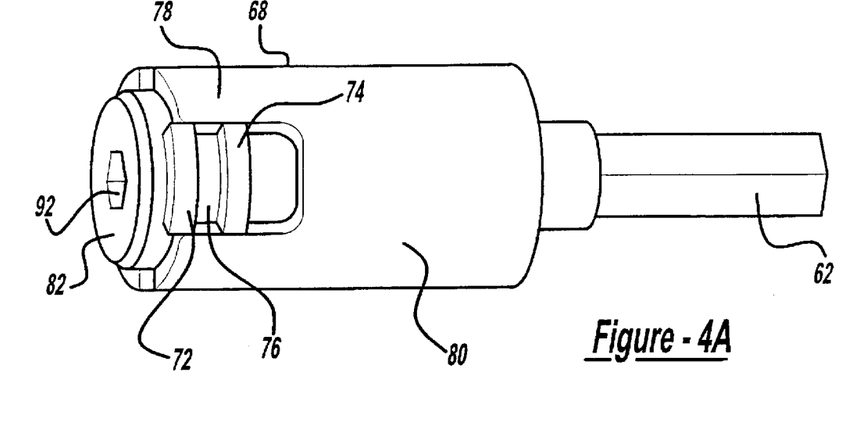
FIG. 4A is a perspective schematic view of the arbor of the present invention with the selector sleeve in its neutral (engaged) position.
Figure 4B:
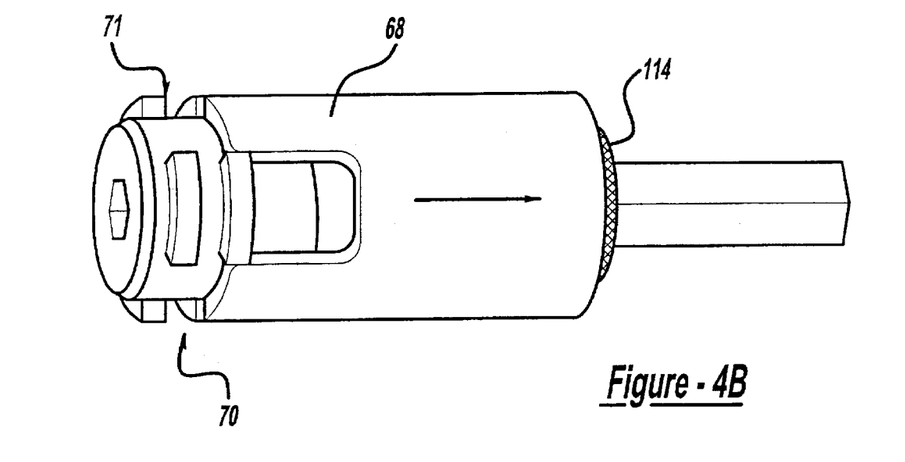
FIG. 4B is a perspective schematic view of the arbor of the present invention with the selector sleeve in its first operative (disengaged) position.
Figure 4C:
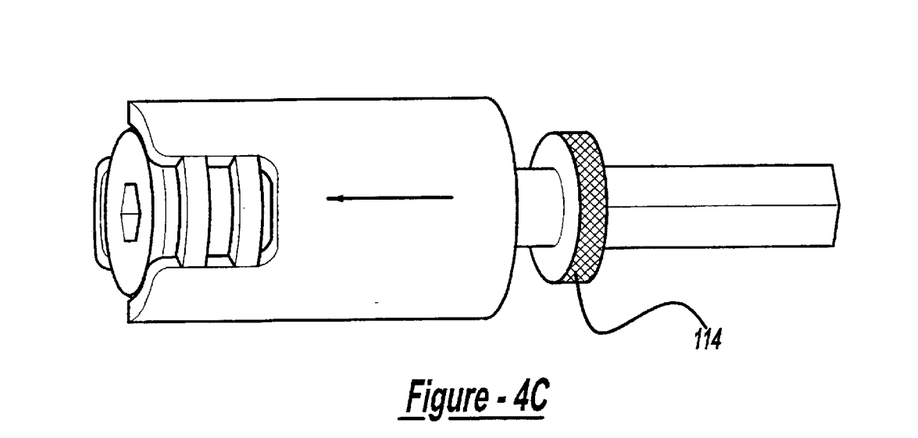
FIG. 4C is a perspective schematic view of the arbor of the present invention with the selector sleeve in its second operative position for removing the pilot bit from the arbor.

The general configuration of the quick change arbor 34 of the present invention will now be described with reference to FIGS. 2 and 3. Arbor 34 generally includes a body 60 having a shank 62 extending rearwardly from a central portion 64 and an enlarged front segment 66. Arbor 34 also includes a selector sleeve 68 coupled to the arbor body 60 for movement between a neutral position (FIG. 4A), a first operative position (FIG. 4B), and a second operative position (FIG. 4C). More particularly, the sleeve 68 is axially slidable along the arbor body 60 from the neutral position, into which the sleeve is normally biased as hereinafter described, rearwardly toward the shank 62 and into its first operative position to allow coupling of the hole saw 32 to the arbor 34. Further, the selector sleeve 68 is axially slidable from its neutral position forward away from the shank and toward the second operative position where the pilot bit is removable from the arbor.

Arbor body 60 has a coupling assembly 70 that includes the selector sleeve 68 and a quick connect configuration generally indicated by reference numeral 71 on the front segment 66. As is described in greater detail below, the coupling assembly 70, mounting tabs 46, and release pockets 44 allow an operator to easily and efficiently connect and disconnect the arbor and hole saw. In general, the coupling assembly 70 is operative in an engaged mode to couple the arbor 34 to the hole saw 32 when the selector sleeve 68 is in its neutral position and in a disengaged mode to allow coupling and uncoupling of the hole saw to the arbor body 60 when the selector sleeve is in its first operative position.

Figure 9:
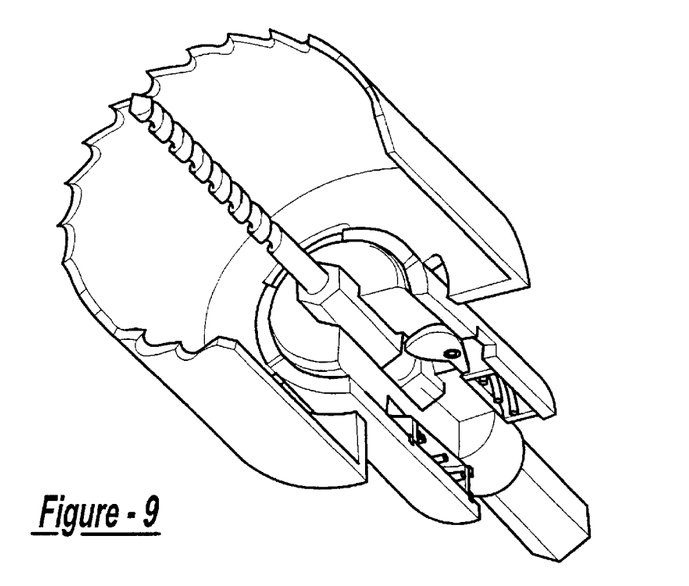
FIG. 9 is a perspective view, partially in section, of the final step of coupling the arbor to the hole saw.
Figure 10A:
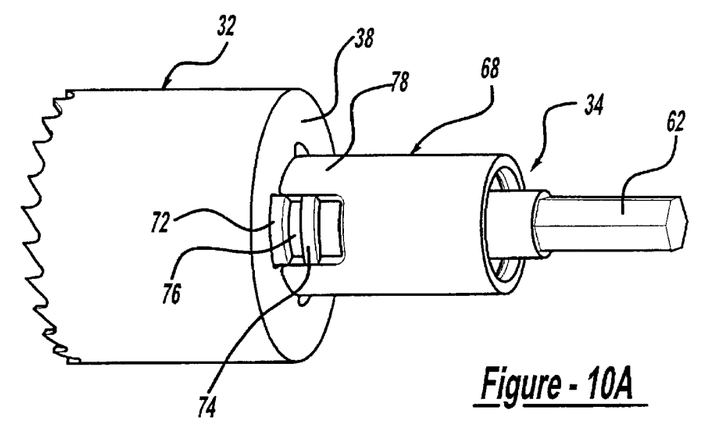
FIGS. 10A–10E illustrate a method for coupling the arbor to the hole saw.
Figure 10B:
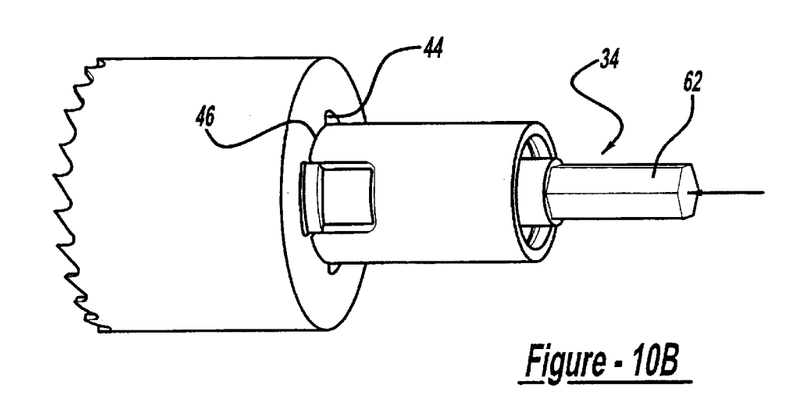
Figure 10C:
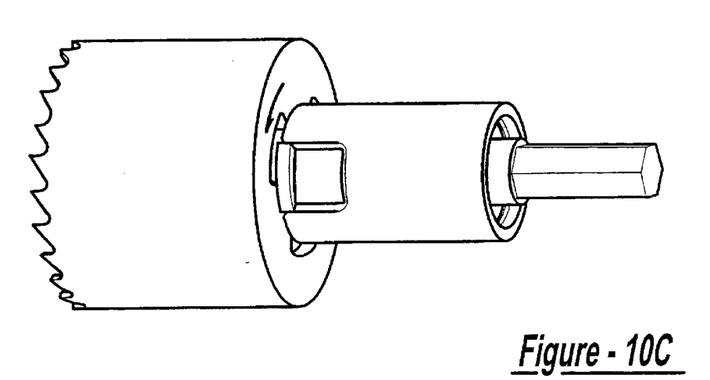
Figure 10D:
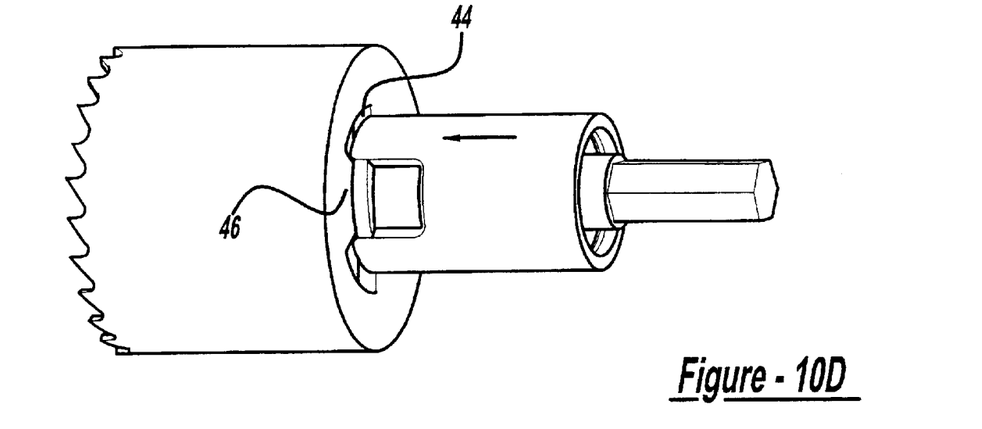
Figure 10E:
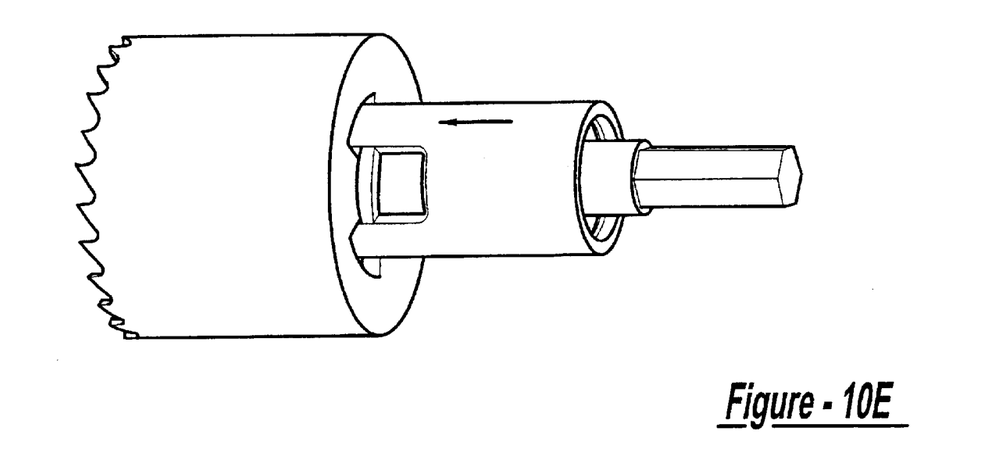

More particularly, in the preferred embodiment, the quick connect configuration 71 on front segment 66 of the arbor body 60 includes inner and outer raised rail sets 72 and 74, respectively, separated from one another to define slot receivers 76. The rail sets 72 and 74 and slot receivers 76 are positioned around the periphery of the front segment 66 to be alignable with the similarly configured relief pockets 44 and mounting tabs 46 on the closed end 38 of hole saw 32. Each of the inner and outer rail sets preferably include three individual raised rails separated by a predetermined circumferential distance that is sufficient to allow the insertion of the mounting tabs 46 between the rails during coupling of the arbor to the hole saw. The selector sleeve 68 includes projections 78 extending axially from a main body 80 of the sleeve. The projections extend between the rails of the inner and outer rail sets and toward an end face 82 of the arbor when the selector sleeve 68 is in its neutral position (FIGS. 9 and 10E).

Figure 5:
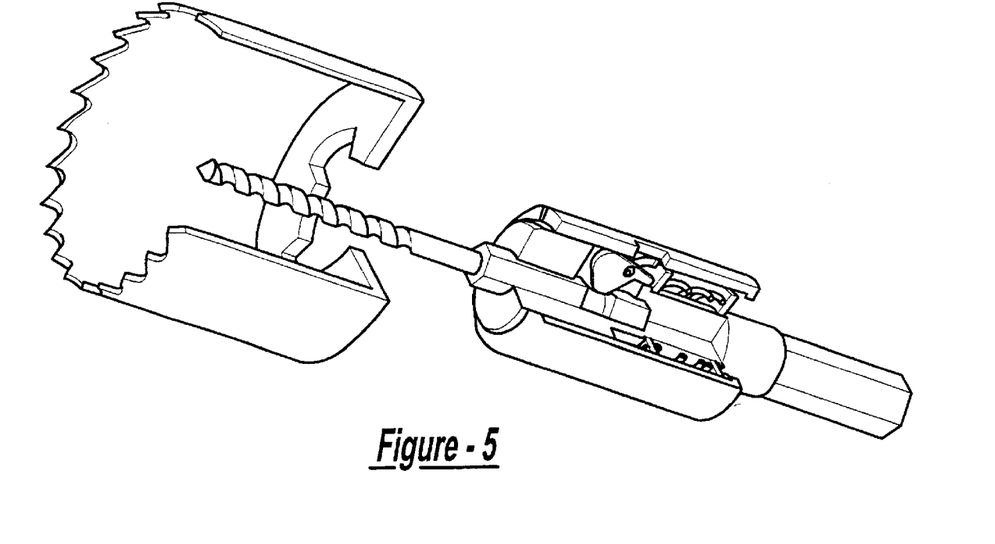
FIG. 5 is a perspective view, partially in section, of the arbor and hole saw of the present invention aligned for coupling.
Figure 6:
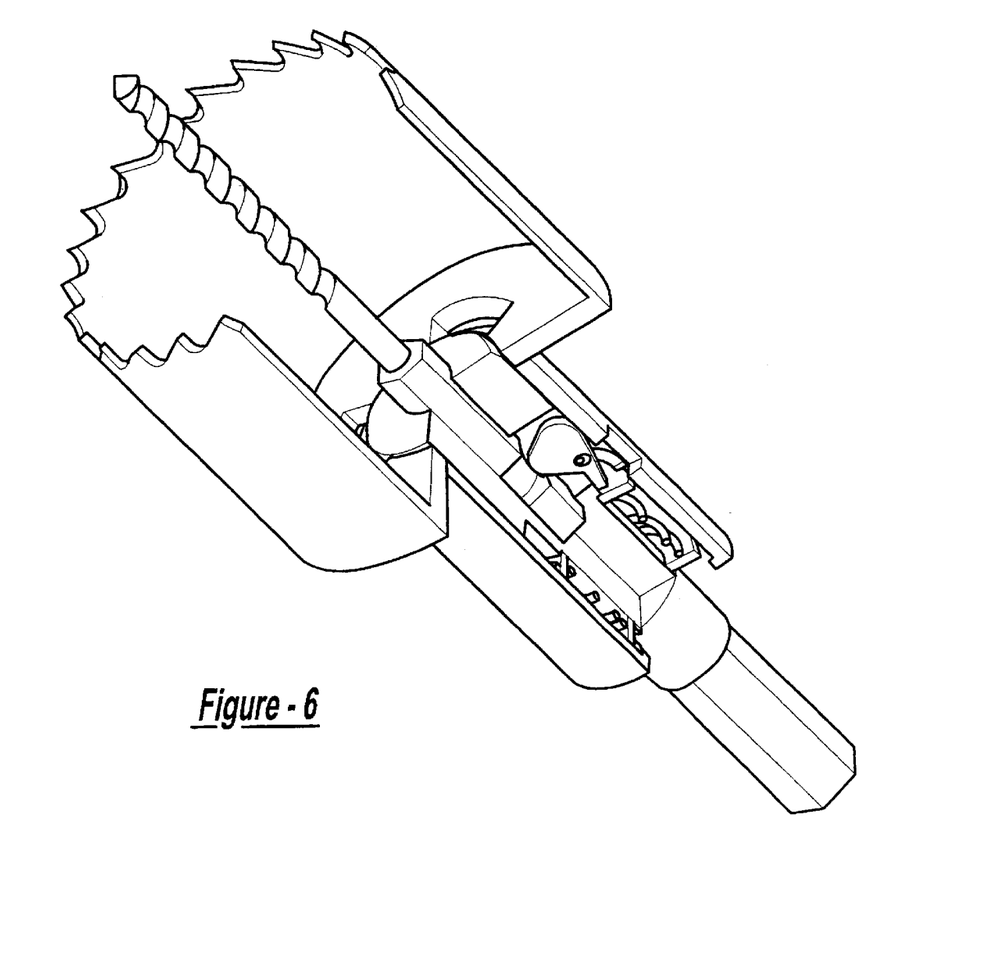
FIG. 6 is a perspective view, partially in section, of the hole saw assembly of the present invention in an initial assembly stage.
Figure 7:
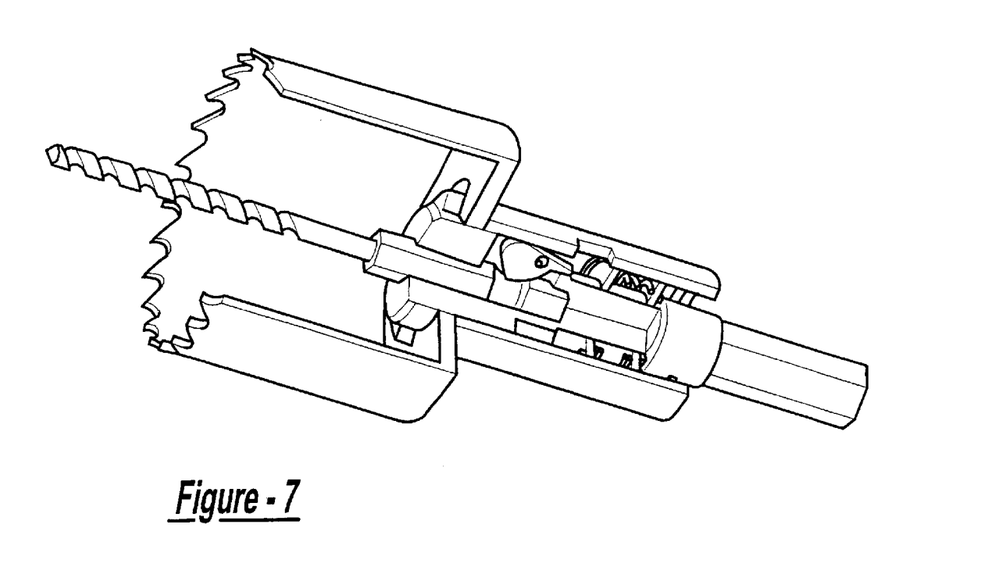
FIG. 7 is a perspective view, partially in section, of the hole saw assembly with the selector sleeve in its first operative (disengaged) position.

The sequence for coupling the arbor to the hole saw will now be described with reference to FIGS. 5–9 and FIGS. 10A–10E. Initially, the arbor 34 is axially aligned with the hole saw 32 and rotationally positioned relative thereto such that the inner and outer raised rail sets 72 and 74 on the front segment 66 of the arbor align with the relief pockets 44 formed in the closed end 38 of the hole saw 32 (FIGS. 5, 6 and 10A). In this orientation, the mounting tabs 46 align with the sleeve projections 78 and the radial spaces between the raised rails. Once properly aligned, the arbor is axially displaced toward the hole saw whereupon the hole saw mounting tabs 46 engage the projections 78 of the selector sleeve 68 and axially displace the selector sleeve rearward toward shank 62 (FIGS. 6 and 10B). As is described in greater detail below, the arbor includes a main internal spring that biases the selector sleeve toward its neutral position and automatically returns the selector sleeve to its neutral position during the coupling and uncoupling sequences described herein. Thus, rearward displacement of the sleeve occurs against the bias of the main spring.

Figure 8:
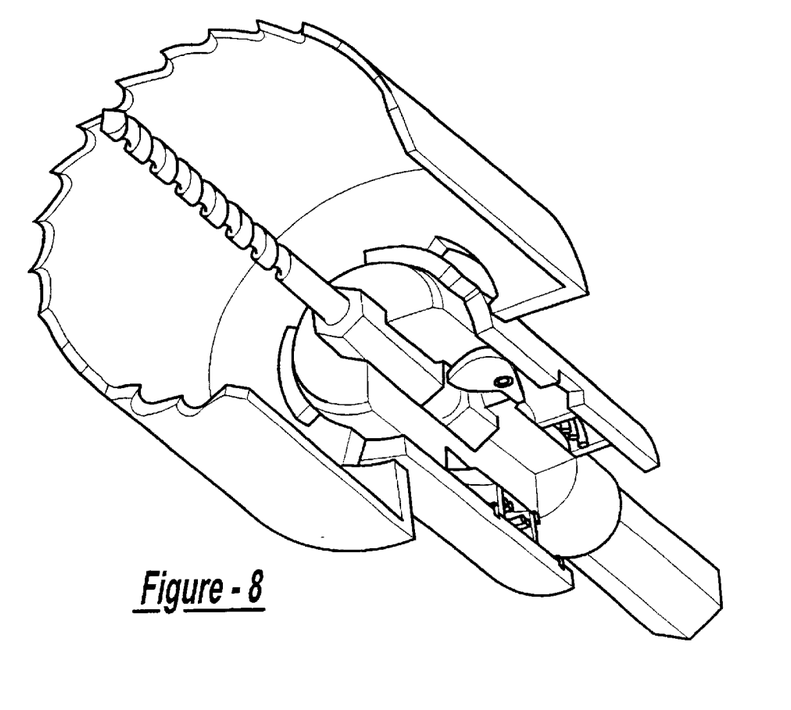
FIG. 8 is a perspective view, partially in section, of the hole saw assembly with the hole saw mounting tabs disposed in the arbor slot receivers.

The selector sleeve 68 reaches the first operative position (FIGS. 6 and 10B) when the arbor 34 has been axially displaced a sufficient distance toward the hole saw 32 such that the mounting tabs 46 are aligned with slot receivers 76. The arbor may then be rotated in either a clockwise or counterclockwise direction relative to the hole saw whereupon the mounting tabs 46 slide within the slot receivers 76 and between the inner and outer raised rail sets 72 and 74 (FIGS. 8 and 10C). Once the arbor and/or hole saw are rotated such that the mounting tabs 46 align with the raised rails 72 and 74, the sleeve projections 78 are aligned with the relief pockets 44 thereby allowing the selector sleeve 68 to be axially displaced in a forward direction under the bias of an internal main spring within the arbor (FIG. 9, 10D and 10E). Thus, the return of selector sleeve 68 to its neutral position under the bias of the internal main spring acts as a stop to prevent over-rotation of the hole saw thereby capturing the mounting tabs 46 on the hole saw within the slot receivers 76 and between the projections 78. As a result, the inner and outer rail sets prevent axial movement of the hole saw 32 and the projections 78 disposed within the relief pockets 44 prevent rotational movement of the hole saw relative to the arbor. The arbor 34 and hole saw 32 may be uncoupled by axially displacing the selector sleeve 68 rearwardly into its first operative position against the bias of the internal main spring and reversing the coupling procedure illustrated in FIG. 10.

It should be clear from the above description that the configuration of the arbor 34 and hole saw 32 allows these elements to be coupled to one another with ease and simplicity while further securely coupling the hole saw to the arbor both axially and rotationally thereby eliminating chatter and wear inherent in conventional hole saw assemblies.

Figure 12A:
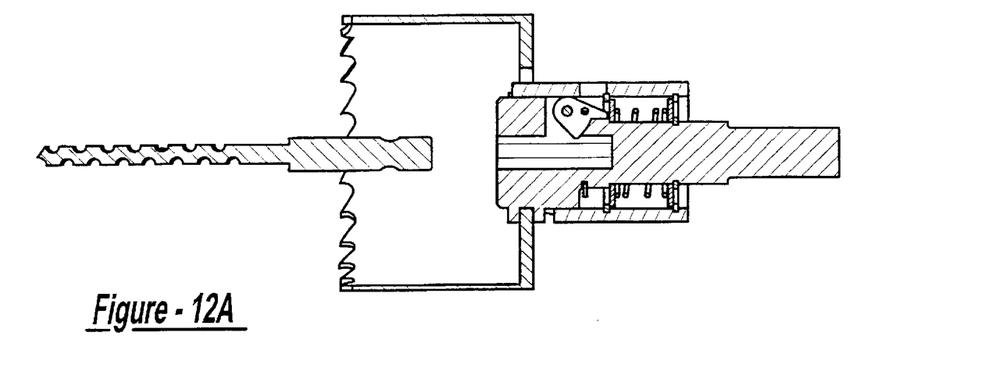
FIGS. 12A–12C are sectional views taken along the longitudinal axis of the assembled hole saw assembly showing a method for coupling the pilot bit to the arbor.
Figure 12B:
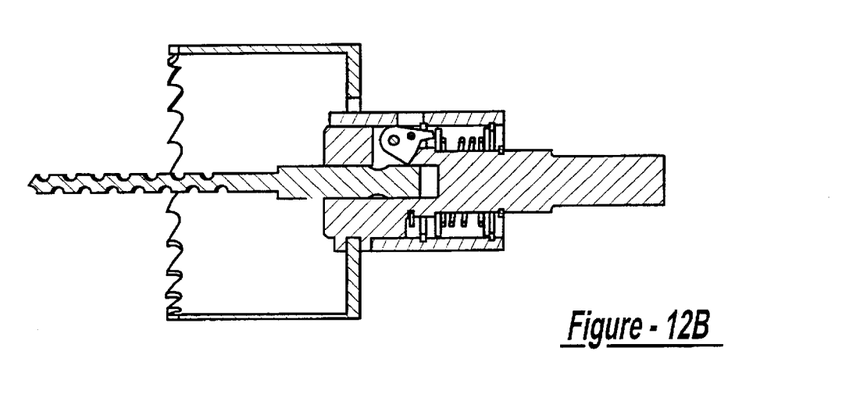
Figure 12C:
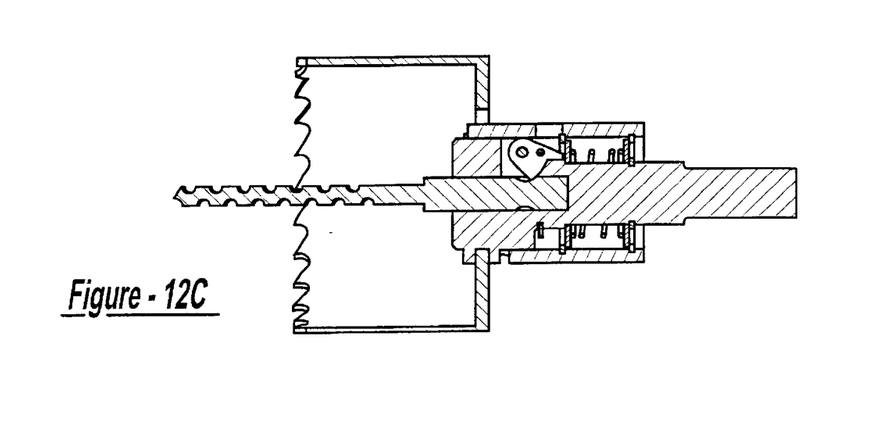

In addition to coupling the arbor to the hole saw 32, the movement of the selector sleeve 68 facilitates efficient coupling and decoupling of the pilot bit within a bit cavity formed in arbor 34. More particularly, as is best illustrated in FIG. 3, the hole saw assembly 30 has a bit retention assembly 84 that includes a pilot key 86 pivotably coupled to the arbor body 60 and a key spring 88 that biases the pilot key 86 radially toward the arbor body and toward counterclockwise rotation, as indicated by arrow 90. That is, the spring 88 biases the key 86 into its engaging position shown in FIG. 12C to define a locked mode of the bit retention assembly 84. When in its locked mode the configuration and positioning of the bit retention assembly and, more particularly, the pilot key 86, allows the pilot bit 36 to be inserted into the bit cavity 92 that extends rearwardly from end face 82 of the arbor body 60 toward the shank 62 thereof. During insertion of the pilot bit 36, as shown in FIGS. 12A–12C, the end of the shank 62 engages and displaces the pilot key 86 in a counterclockwise direction opposite arrow 90 (FIG. 3) against the bias of spring 88. When the shank is inserted a sufficient distance within the cavity 92 the bias of the spring 88 returns the pilot key 86 to its engaged position within the detent groove 58 thereby coupling the pilot bit 36 to the arbor 34. However, when the bit retention assembly is in its locked mode, the pilot key 86 prevents removal of the pilot bit. Specifically, a stop leg 94 (FIG. 3) on the key prevents clockwise rotation of the key 86 and the proximity of the key to the inner surface 96 (FIG. 3) of the sleeve 68 prevents outward radial displacement of the key. As a result, the engagement of the key 86 in the detent groove 58 maintains the coupling of the bit 36 within the arbor 34. The inner surface 96 of the sleeve 68 remains in blocking engagement with the pilot key 86 when the selector sleeve is in either its neutral position or its first operative position thereby maintaining the bit retention assembly 84 in its locked mode unless the selector sleeve is moved to its second operative position.

Figure 11:
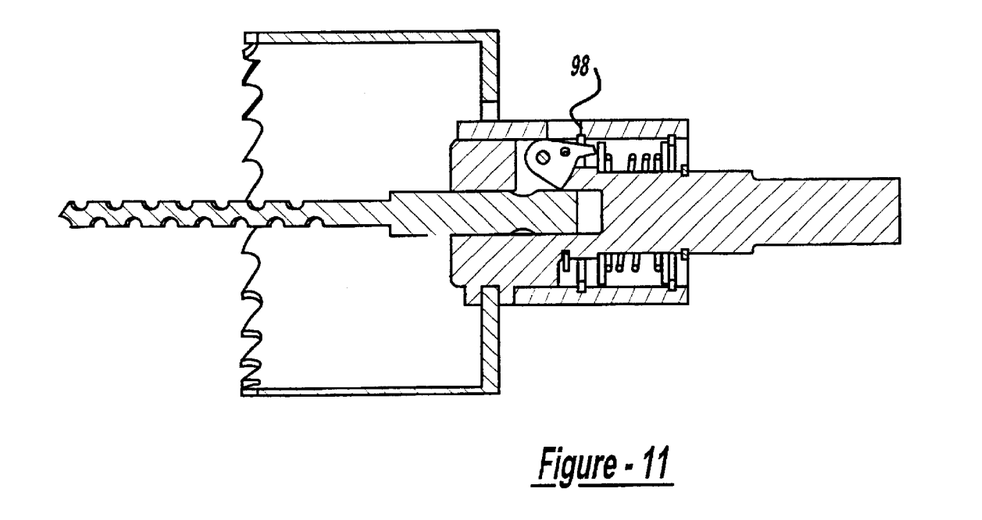
FIG. 11 is a sectional view taken along the longitudinal axis of the assembled hole saw assembly illustrated in FIG. 2 showing the arbor, hole saw, and pilot bit with the selector sleeve in its second operative position for removing the pilot bit from the arbor.

When the selector sleeve 68 is axially displaced in a forward direction relative to the arbor, the bit retention assembly is moved into its unlocked mode wherein the pilot bit 36 is removable from the cavity 92. More particularly, displacement of the selector sleeve 68 into its second operative position (FIG. 11), places a pocket 98 (FIGS. 3 and 11) in the selector sleeve into operative engagement with the pilot key 86. Thus, when the pilot bit is removed from the cavity, the shank 62 radially displaces the pilot key 86 against the bias of spring 88 and into pocket 98 to allow removal of the pilot bit 36.

It should be apparent from the above description that the hole saw assembly of the present invention provides simple and efficient connection of the arbor 34 to both the hole saw 32 and the pilot bit 36 through manipulation of the selector sleeve 68. This arrangement eliminates not only the chatter present in conventional arbor/hole saw connections but also eliminates the need for a set screw to couple the pilot bit to the arbor. As a result, the present invention reduces the complexity of the assembly and eliminates the need for additional tools to connect and disconnect the pilot bit to the arbor. Finally, the quick connect feature of the hole saw and arbor allows an operator to quickly remove the hole saw from the arbor and dislodge any plugs of cut material that collect within the hole saw.

As noted above, the selector sleeve 68 is biased into its neutral position to enhance the above operation and attendant benefits. While a variety of biasing structures may be used, the preferred arrangement, as best illustrated in FIG. 3, includes a front snap ring 100 and a first rear snap ring 102 fixed to the selector sleeve 68, a second rear snap ring 104 fixed to the arbor body 60, a front washer 106, and a rear washer 108. An internal main spring 110 (generally discussed above) is disposed between the front and rear washers 106 and 108 while a sleeve shoulder 112 prevents forward movement of the front washer 106 relative to the arbor body 60 and the second rear snap ring 104 prevents rearward movement of the second washer 108. Accordingly, upon forward movement of the selector sleeve 68 from its neutral position (FIG. 4A) to its second operative position (FIG. 4C), the first rear snap ring 102 displaces the rearward washer in a forward direction and compresses the main spring 110 thereby biasing the selector sleeve toward its neutral position. Similarly, upon rearward movement of the selector sleeve from its neutral position to its first operative position (FIG. 4B), the front snap ring 100 axially displaces the front washer 106 toward the shank 62 and again compresses the main spring 110 so as to bias the selector sleeve toward its neutral position.

In order to further facilitate the manipulation of the selector sleeve 68 during coupling and decoupling of the pilot bit and/or hole saw to the arbor, the arbor may be provided with a collar 114 (FIGS. 4B and 4C) on the shank. The collar is configured and located on the arbor to provide the operator with an object to grasp when manipulating the selector sleeve. Additionally, in the illustrated embodiment, the collar 114 limits rearward axial movement of the selector sleeve such that the mounting tabs 46 on the hole saw 32 align with the slot receivers 76 on the arbor 34 when the hole saw assembly is in the assembly stage shown in FIGS. 4B and 7. Alternatively, those skilled in the art will appreciate that a variety of stop or detent configurations, such as a stop located either between the sleeve 68 and arbor body 60 or on the external surfaces of the arbor body, may be used to limit rearward axial movement of the selector sleeve without departing from the spirit and scope of the invention. Rearward axial movement of the selector sleeve 68 may also be controlled or limited by the spacing of washers 106 and 108.

Figure 13A:
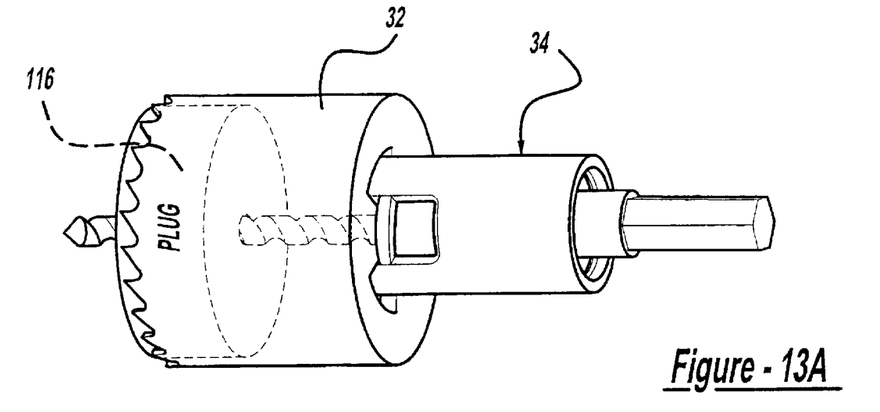
FIGS. 13A–13E are perspective schematic views of the hole saw assembly of the present invention illustrating a method for discharging a plug of cut material from the hole saw.
Figure 13B:
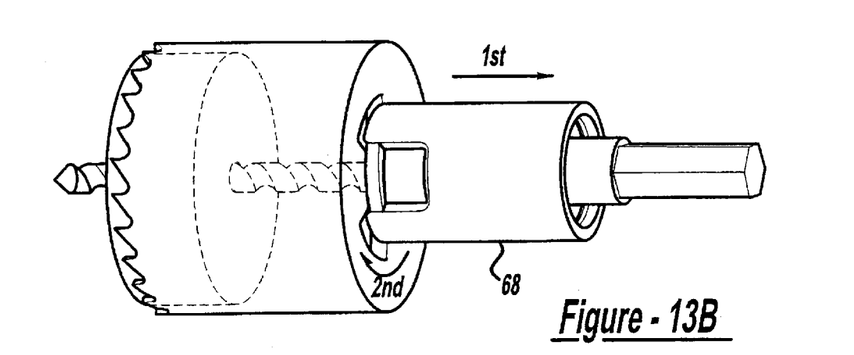
Figure 13C:
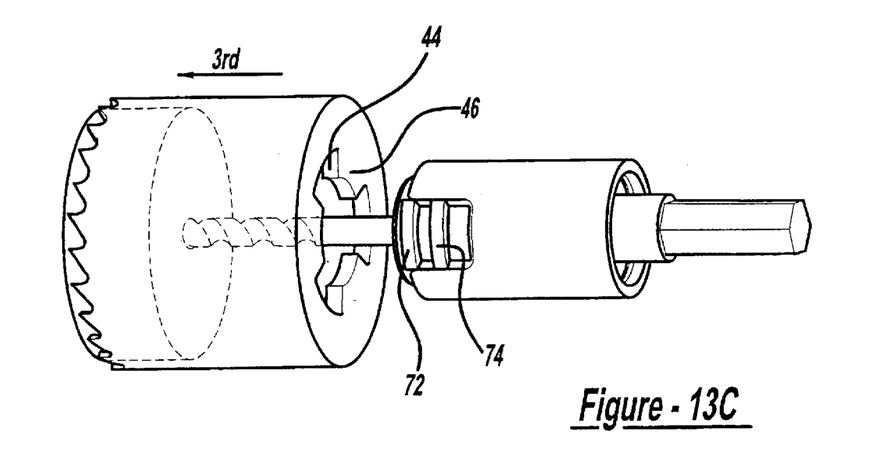
Figure 13D:
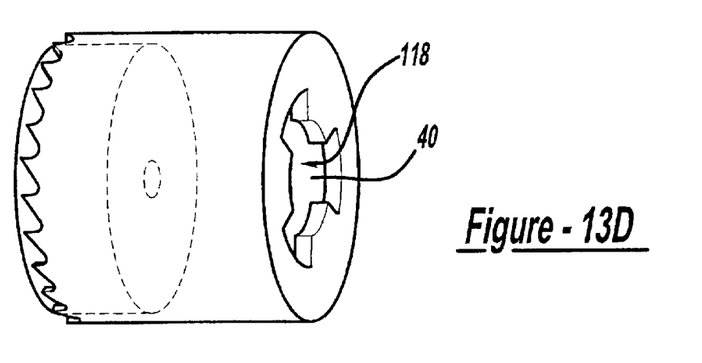
Figure 13E:
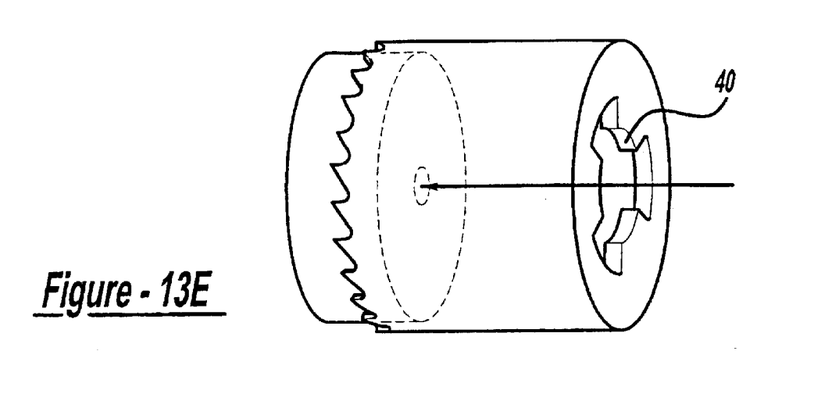

With the above description in mind, a plug ejection sequence will now be described with reference to FIGS. 13A–13E. In FIG. 13A, a plug 116 that has been cut through operation of the hole saw assembly is shown within a cavity 118 (FIGS. 3 and 13D) in the hole saw 32. By the sequence described herein, the present invention provides a simple and efficient method of ejecting the plug from the hole saw cavity 118. More particularly, the plug may be removed from the hole saw cavity 118 by uncoupling the hole saw 32 from the arbor 34 and axially displacing the plug relative to the hole saw. The plug ejection sequence includes axially displacing the selector sleeve 68 rearward toward shank 62 to place the selector sleeve in its first operative position (FIG. 13B). The hole saw 32 is then rotated either clockwise or counterclockwise relative to the arbor 34 to align the inner and outer raised rail sets 72 and 74 with the release pockets 44 of the hole saw 32 in the manner illustrated in FIGS. 6 and 7. The hole saw 32 may then be uncoupled from the arbor 34 by axially displacing the hole saw relative to the arbor as illustrated in FIG. 13C. Finally, with the hole saw uncoupled from the arbor (FIG. 13D), the plug 116 may be axially displaced and ejected from the hole saw cavity 118 such as by use of a tool disposed within the hole saw aperture 40 (FIG. 13E). Thus, it should be appreciated that the ease and simplicity with which the arbor and hole saw may be coupled and uncoupled to one another facilitates not only the connection of the arbor to the hole saw for operation but allows plugs of cut material to be easily ejected from the hole saw.

Figure 14:
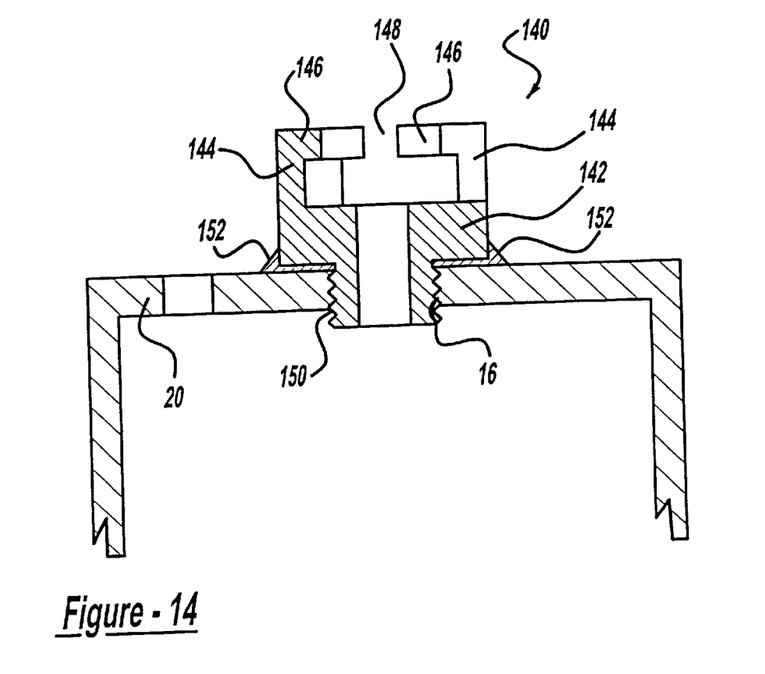
FIG. 14 is a cross-sectional view of a conventional hole saw which is provided with an adapter for adapting the conventional hole saw for use with the arbor of the present invention.
Figure 15:
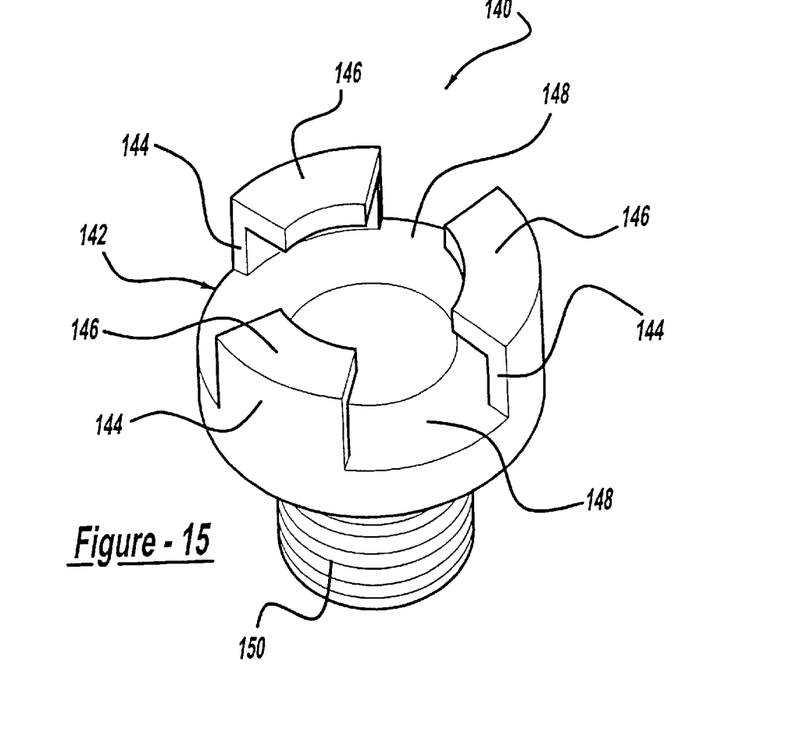
FIG. 15 is a perspective view of the adapter shown in FIG. 14.

With reference to FIGS. 14 and 15, an adapter 130 is provided for adapting conventional holesaws (such as shown in FIG. 1) for use with the arbor 34 of the present invention. The adapter 140 includes a base portion 142 and a plurality of axially extending legs 144 which terminate in a plurality of radially inwardly extending mounting tabs 146 defining a plurality of relief pockets 148 therebetween. The base portion 142 is provided with a threaded post 150 which is threaded to cooperate with the threaded aperture 16 in a conventional hole saw 10. The base portion 142 and threaded post 150 include an aperture extending therethrough for receiving the pilot pit 36. The base portion 142 can also be welded 152 to the closed end 20 of the hole saw in addition to, or as an alternative to, the threaded connection between the threaded post 150 and the threaded aperture 16. Other known connecting methods can also be used. The adapter 140 gives a conventional hole saw a plurality of mounting tabs 146 which engage with the arbor 34 in the same manner as the mounting tabs 46 of the hole saw 32 described above.

The invention being thus described, it will be obvious that the same may be varied in many ways. Such variations are not to be regarded as a departure from the spirit and scope of the invention, and all such modifications as would be within the knowledge of one skilled in the art are intended to be included within the scope of the following claims.

What is claimed is:

1. An arbor for coupling a hole saw to a drill, comprising:
    a body having a coupling end, a shank opposite said coupling end, and a receiving slot proximate said coupling end, said receiving slot adapted to receive a hole saw tab to couple the hole saw to the body; and
    a selector sleeve slidably coupled to said body for movement between a first operative position to allow said receiving slot to receive the hole saw tab and a neutral position wherein said selector sleeve prevents removal of the hole saw tab from the receiving slot.

2. The arbor of claim 1 wherein said body includes a cavity extending axially from said coupling end toward said shank, said arbor further including a bit retention assembly coupled to said body in operative engagement with said cavity, said bit retention assembly being operable in a locked mode to couple a pilot bit to the body when said selector sleeve is in said neutral position or said first operative position and an unlocked mode to allow removal of a pilot bit from the cavity when said selector sleeve is in a second operative position, said selector sleeve being operably coupled to said bit retention assembly and adapted to allow said bit retention assembly to operate in said unlocked mode when said selector sleeve is moved to said second operative position.

3. The arbor of claim 2 wherein neutral position is between said first and second operative positions and wherein said arbor further includes a spring normally biasing said selector sleeve into said neutral position.

4. A hole saw assembly comprising:
    a hole saw having an end plate with relief pockets and mounting tabs;
    a pilot bit having a shank with a non-circular cross section and a detent groove;
    an arbor having a body, a bit retention assembly operative in a locked mode to couple the pilot bit to the arbor body and an unlocked mode to allow removal of said pilot bit from said arbor body, and a coupling assembly operative in an engaged mode to couple the arbor to the hole saw and a disengaged mode to allow coupling and uncoupling of the hole saw to the arbor body, said coupling assembly including a selector sleeve coupled to said body for movement between a neutral position wherein the bit retention assembly is in its locked mode and the coupling assembly is in its engaged mode, a first operative position wherein the coupling assembly is in its disengaged mode and the bit retention assembly is in its locked mode, and a second operative position wherein the bit retention assembly is in its unlocked mode and the coupling assembly is in its engaged mode.

5. A method for ejecting a plug of cut material from a cavity in a hole saw that is connectable to an arbor, the arbor includes a body and a selector sleeve movably coupled to the body, said method comprising:
    moving the selector sleeve to a first operative position;
    rotating the hole saw relative to the arbor;
    axially displacing the hole saw away from the arbor; and
    ejecting the plug from the hole saw cavity.

6. An adapter for a hole saw, comprising:
    a base portion;

a plurality of legs extending axially in a first direction from said base portion and each terminating in a radially inwardly extending mounting tab, said mounting tabs being spaced from one another by a distance approximately equal to a width of said mounting tabs; and a threaded Post extending axially from said base portion in a second direction opposite to said first direction.

7. A method for coupling and uncoupling a pilot bit and a hole saw to an arbor, said arbor including a body and a selector sleeve movably coupled to said body, said method comprising:

coupling the pilot bit to the arbor body;
coupling the hole saw to the arbor body by
axially aligning the arbor with the hole saw,
axially displacing the arbor toward the hole saw, and
rotating the arbor relative to the hole saw; and
uncoupling the hole saw from the arbor body by
moving the selector sleeve to a first operative position,
rotating the arbor relative to the hole saw, and
axially displacing the hole saw away from the arbor.

8. The method of claim 7 further comprising uncoupling the pilot bit from the hole saw by moving the selector sleeve to a second operative position and axially displacing the pilot bit away from the arbor.

9. An arbor for coupling a hole saw and a pilot bit to a drill, comprising:

a body having a coupling end, a shank opposite said coupling end, a receiving slot proximate said coupling end, and a cavity extending axially from said coupling end toward said shank, said receiving slot adapted to receive a hole saw tab to couple the hole saw to the body;

a selector sleeve slidably coupled to said body for movement between a first operative position to allow said receiving slot to receive the hole saw tab, a neutral position wherein said selector sleeve prevents removal of the hole saw tab from the receiving slot, and a second operative position to allow the pilot bit to be removed from said cavity; and a spring operatively coupled to said sleeve and said body to normally bias said sleeve toward said neutral position when said sleeve is in said first operative position or said second operative position.

10. The arbor of claim 1 wherein said selector sleeve compresses the spring then the selector sleeve is moved from its neutral position towards its first operative position and wherein the selector sleeve compresses the spring when the selector sleeve is moved from its neutral position toward its second operative position.

11. A hole saw, comprising:

an end plate;

a generally cylindrical body extending from said end plate and terminating in cutting teeth;

an adapter including a base portion having a threaded post extending axially in a first direction which is connected to a threaded opening in said end plate and a plurality of legs extending axially from said base portion in a second direction opposite to said first direction and each terminating in a radially inwardly extending mounting tab.

* * * * *

UNITED STATES PATENT AND TRADEMARK OFFICE
CERTIFICATE OF CORRECTION

PATENT NO. : 6,705,807 B1
DATED : March 16, 2004
INVENTOR(S) : Scott Rudolph et al.

It is certified that error appears in the above-identified patent and that said Letters Patent is hereby corrected as shown below:

Column 9,
Line 7, "Post" should be -- post --.

Column 10,
Line 14, "then" should be -- when --.

Signed and Sealed this

Fourth Day of January, 2005

JON W. DUDAS
*Director of the United States Patent and Trademark Office*